United States Patent
Hisayama et al.

(10) Patent No.: US 11,313,567 B2
(45) Date of Patent: Apr. 26, 2022

(54) REFRIGERATION CYCLE APPARATUS

(71) Applicant: DAIKIN INDUSTRIES, LTD., Osaka (JP)

(72) Inventors: Kazushi Hisayama, Osaka (JP); Tetsuya Okamoto, Osaka (JP); Yoshinobu Tsumura, Osaka (JP); Kebi Chen, Osaka (JP); Masanori Ukibune, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/043,020

(22) PCT Filed: Mar. 22, 2019

(86) PCT No.: PCT/JP2019/012197
§ 371 (c)(1),
(2) Date: Sep. 29, 2020

(87) PCT Pub. No.: WO2019/188826
PCT Pub. Date: Oct. 3, 2019

(65) Prior Publication Data
US 2021/0018188 A1    Jan. 21, 2021

(30) Foreign Application Priority Data
Mar. 30, 2018 (JP) .............................. JP2018-070228

(51) Int. Cl.
*F24F 1/12* (2011.01)
(52) U.S. Cl.
CPC ...................... *F24F 1/12* (2013.01)
(58) Field of Classification Search
CPC ...... F24F 1/12; F24F 13/24; F24F 1/16; F24F 1/40; F24F 1/10; F24F 1/22;
(Continued)

(56) References Cited

U.S. PATENT DOCUMENTS 3,714,795 A    2/1973  Fowell et al.
6,260,373 B1 *  7/2001  Rockwood ............ F16F 7/1028
                                              165/69
(Continued)

FOREIGN PATENT DOCUMENTS

JP         59-115230 U    8/1984
JP          5-10843 U    2/1993
(Continued)

OTHER PUBLICATIONS

Definition of Integral, Merriam-Webster, https://www.merriam-webster.com/dictionary/integral, accessed Nov. 19, 2020 (Year: 2020).*
(Continued)

*Primary Examiner* — Cassey D Bauer
(74) *Attorney, Agent, or Firm* — Birch, Stewart, Kolasch & Birch, LLP

(57) ABSTRACT

A refrigeration cycle apparatus has a compressor disposed via a bottom member of a housing, a second elastic member, a base, and a first elastic member. A first electric component that drives a motor for the compressor and a second electric component that performs another control are fixed to the base and disposed. The base has an upper surface that contacts the first elastic member and a lower surface that contacts the second elastic member. The first electric component and the second electric component are fixed to the upper surface directly or indirectly via a substrate and/or an electric-component casing. Top portions of the first electric component and the second electric component are lower than a top portion of the compressor.

11 Claims, 9 Drawing Sheets

(58) Field of Classification Search
CPC .............. F25B 2400/071; F25B 49/022; F25B 49/025; F25B 2400/077; F25B 2500/13
USPC ........................................................ 62/295
See application file for complete search history.

(56) References Cited

U.S. PATENT DOCUMENTS

| | | | | |
|---|---|---|---|---|
| 7,814,760 | B2* | 10/2010 | Immel | ................ F04B 39/0044 62/295 |
| 8,348,218 | B2* | 1/2013 | Logan | ..................... H02K 5/24 248/638 |

FOREIGN PATENT DOCUMENTS

| | | | |
|---|---|---|---|
| JP | 2003-232543 | A | 8/2003 |
| JP | 2005-241197 | A | 9/2005 |
| JP | 2009-30879 | A | 2/2009 |
| JP | 2010-145054 | A | 7/2010 |
| JP | 2010-243033 | A | 10/2010 |
| JP | 2011-52842 | A | 3/2011 |

OTHER PUBLICATIONS

International Search Report, issued in PCT/JP2019/012197, dated Apr. 23, 2019.
English translation of the International Preliminary Report on Patentability and Written Opinion of the International Searching Authority, dated Oct. 15, 2020, for International Application No. PCT/JP2019/012197.
Machine translation of Publication No. JPS-59-115230U.
Extended European Search Report dated Mar. 17, 2021 in corresponding European Application No. 19774862.7.

* cited by examiner

REFRIGERATION CYCLE APPARATUS

TECHNICAL FIELD

The present disclosure relates to a refrigeration cycle apparatus.

BACKGROUND ART

In some usage environments, a heat pump apparatus is required to have low-noise performance. To achieve low-noise performance, it is required to suppress vibration of a compressor constituting a refrigerant circuit of a heat pump from being transmitted to the entirety of the apparatus. For such a purpose, Patent Literature 1 (Japanese Unexamined Patent Application Publication No. 2005-241197) discloses a double anti-vibration structure. Patent Literature 1 describes disposing a support member in an apparatus body via a second anti-vibration member and mounting a compressor on the support member via a first anti-vibration member.

SUMMARY OF INVENTION

Technical Problem

Patent Literature 1 includes no description about arrangement of an electric component. It is conceivable to dispose, close to a compressor, an electric component that drives a motor for the compressor, on the support member in Patent Literature 1. In general, however, an electric component that performs overall control of a heat pump apparatus, such as control of an expansion valve, is generally fixed in a location away from a compressor to a housing.

When, as above, an electric component that drives a motor for a compressor is fixed to the support member on the first anti-vibration member with an electric component that performs overall control being disposed in a housing, there is a problem that a difference is generated in vibration states of the two components, that is, displacement, and a wire is subjected to a stress. There is also a possibility of contact failure and disconnection of a wire being caused by repeated stresses due to such vibrations.

Solution to Problem

A refrigeration cycle apparatus according to a first aspect includes a housing, a second elastic member, a base, a first elastic member, a compressor, a first electric component, and a second electric component. The housing includes a bottom member. The second elastic member is disposed on the bottom member. The base is disposed on the bottom member via the second elastic member. The first elastic member is disposed on the base. The compressor is configured to compress a refrigerant. The compressor is disposed on the base via the first elastic member. The first electric component is configured to drive a motor for the compressor. The second electric component is configured to perform control that differs from control performed by the first electric component. The first electric component and the second electric component are fixed to the base. The base has an upper surface that contacts the first elastic member and a lower surface that contacts the second elastic member. The first electric component and the second electric component are fixed to the upper surface directly or indirectly via a substrate and/or an electric-component casing. Top portions of the first electric component and the second electric component are lower than a top portion of the compressor.

In the refrigeration cycle apparatus according to the first aspect, due to the first electric component and the second electric component being disposed on the common base, displacement is not easily generated between the two electric components, even when the base vibrates, and thus, a wire between the two electric components does not easily come off and is not easily disconnected.

A refrigeration cycle apparatus according to a second aspect is the refrigeration cycle apparatus according to the first aspect, further including an expansion valve. The second electric component is configured to control at least an opening degree of the expansion valve.

A refrigeration cycle apparatus according to a third aspect is the refrigeration cycle apparatus according to the first aspect or the second aspect, the refrigeration cycle apparatus further including an electric-component unit. The electric-component unit includes the first electric component and the second electric component that are integral with each other. The electric-component unit is fixed to the base.

In the refrigeration cycle apparatus according to the third aspect, due to the first electric component and the second electric component being integral with each other, the wire can be short, and contact failure or disconnection does not easily occur when vibration is occurred.

A refrigeration cycle apparatus according to a fourth aspect is the refrigeration cycle apparatus according to the third aspect, the electric-component unit further including an electric-component casing. The first electric component and the second electric component are housed in and fixed to the electric-component unit. Due to the first electric component and the second electric component being housed in the electric-component casing, it becomes possible to prevent dust, moisture, and the like from adhering to the first electric component and the second electric component.

A refrigeration cycle apparatus according to a fifth aspect is the refrigeration cycle apparatus according to any one of the first aspect to the fourth aspect, the refrigeration cycle apparatus further including an air heat exchanger, a fan, and a fan motor. The fan is configured to generate a flow of air toward the air heat exchanger. The fan motor is configured to drive the fan. The fan motor is controlled by the second electric component. The fan and the fan motor are fixed to the base.

In the refrigeration cycle apparatus according to the fifth aspect, due to the second electric component and the fan motor being fixed to the common base, displacement between the second electric component and the fan motor is not easily generated. Consequently, a wire for fan operation does not easily come off and is not easily disconnected. Moreover, vibration of the base is suppressed, and noise is reduced.

A refrigeration cycle apparatus according to a sixth aspect is the refrigeration cycle apparatus according to the fifth aspect, the air heat exchanger being fixed to the base.

In the refrigeration cycle apparatus according to the sixth aspect, due to the fan and the air heat exchanger being fixed to the same base that vibrates, it is possible to suppress a drift from being generated by turbulence of the flow of air, compared with when one of the fan and the air heat exchanger is placed on the base that vibrates.

A refrigeration cycle apparatus according to a seventh aspect is the refrigeration cycle apparatus according to the fifth aspect or the sixth aspect, the refrigeration cycle apparatus further including a rectifier portion. The rectifier portion is configured to rectify blown air of the fan. The rectifier portion is fixed to the base.

In the refrigeration cycle apparatus according to the seventh aspect, due to the rectifier portion and the fan both being fixed to the base, generation of a drift is suppressed.

DESCRIPTION OF EMBODIMENTS

Figure 1:
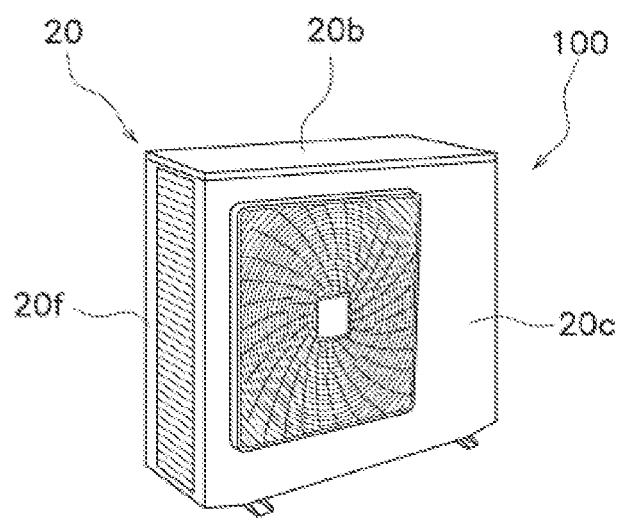
FIG. 1 is a perspective view of an appearance of a refrigeration cycle apparatus of a first embodiment.
Figure 2:
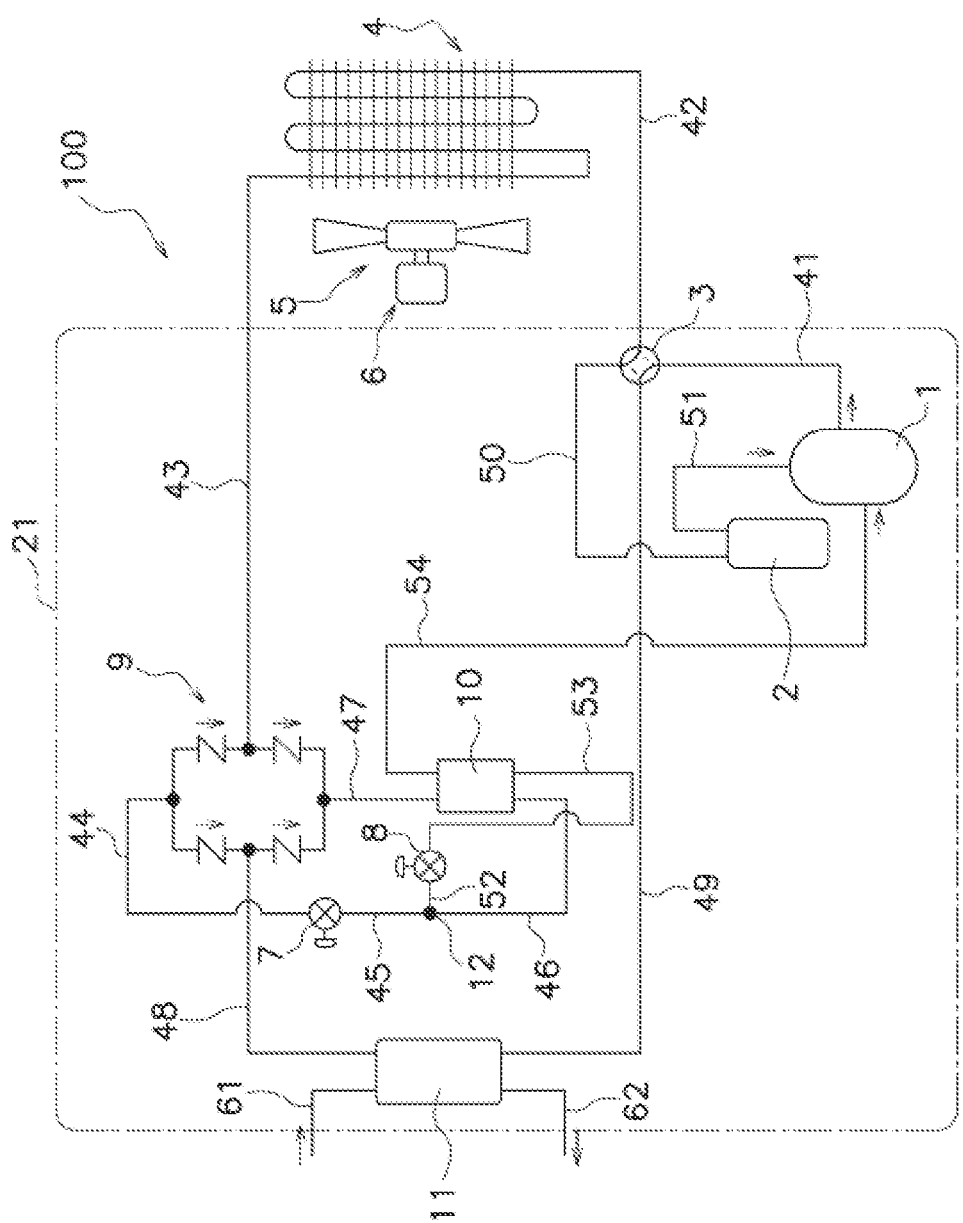
FIG. 2 is a diagram of a refrigerant circuit of the refrigeration cycle apparatus of the first embodiment.

First Embodiment (1) Configuration of Refrigerant Circuit of Refrigeration Cycle Apparatus A perspective view of an appearance of a refrigeration cycle apparatus 100 of a first embodiment and a refrigerant circuit are illustrated in FIG. 1 and FIG. 2, respectively. The refrigeration cycle apparatus of the present embodiment is an apparatus that uses a heat pump and that heats and/or cools water. By using heated or cooled water, the refrigeration cycle apparatus 100 can be utilized as a water heater or a water cooler. Alternatively, by using heated or cooled water as a medium, the refrigeration cycle apparatus 100 may constitute an air conditioning apparatus that performs heating and cooling.

As illustrated in FIG. 2, the refrigerant circuit of the refrigeration cycle apparatus 100 of the present embodiment includes a compressor 1, an accumulator 2, a four-way switching valve 3, an air heat exchanger 4, a check valve 9, a first expansion valve 7, a second expansion valve 8, an economizer heat exchanger 10, and a water heat exchanger 11. With each device and a junction 12 connected to each other by pipes 41 to 54, a refrigerant circulates in each device, and a vapor compression refrigeration cycle is performed. The refrigeration cycle apparatus 100 further includes a fan 5 that sends air to the air heat exchanger 4, and a motor 6 that drives the fan.

When water is to be heated, the refrigeration cycle apparatus 100 operates as follows. The refrigerant is compressed by the compressor 1 and sent to the water heat exchanger 11, which acts as a condenser. The refrigerant is decompressed by, mainly, the first expansion valve 7, vaporized by the air heat exchanger 4, which acts as an evaporator, and sent to the compressor 1 again. Water enters the water heat exchanger 11 through a water entrance pipe 61, is heated by the refrigerant, and discharged through a water exit pipe 62. Heating and cooling of the water are performed by changing the flow of the refrigerant by switching of the four-way switching valve 3. When the water is to be cooled, the water heat exchanger 11 acts as a refrigerant evaporator.

(2) Arrangement of Devices in Refrigeration Cycle Apparatus

An arrangement of devices in the refrigeration cycle apparatus will be described by using the front view in FIG. 3, the top view in FIG. 4, and the arrangement plan of the electric-component unit 30 in FIG. 5. For ease of understanding, detailed description of a refrigerant pipe, a signal line, electric wires, such as an electric power line, and the like is omitted, as appropriate, in FIG. 3, FIG. 4, and FIG. 5.

Figure 3:
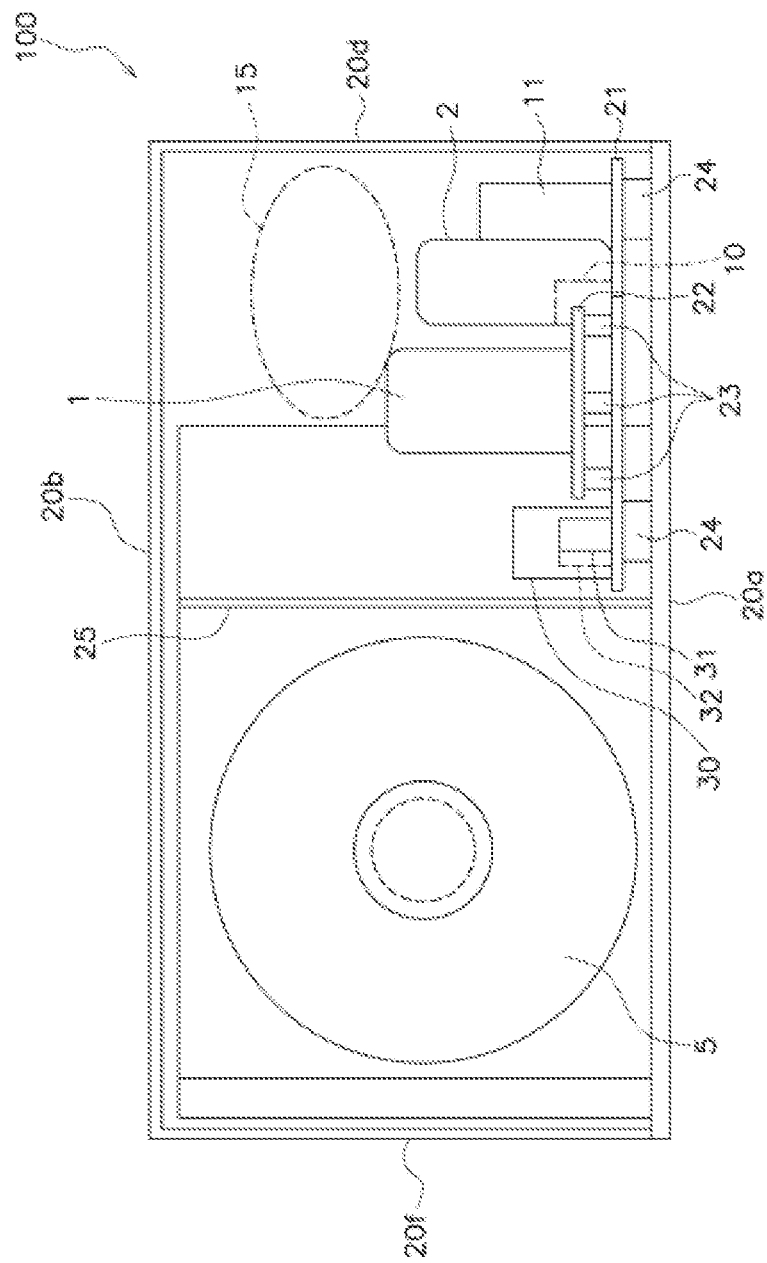
FIG. 3 is a schematic front view of the refrigeration cycle apparatus of the first embodiment.
Figure 4:
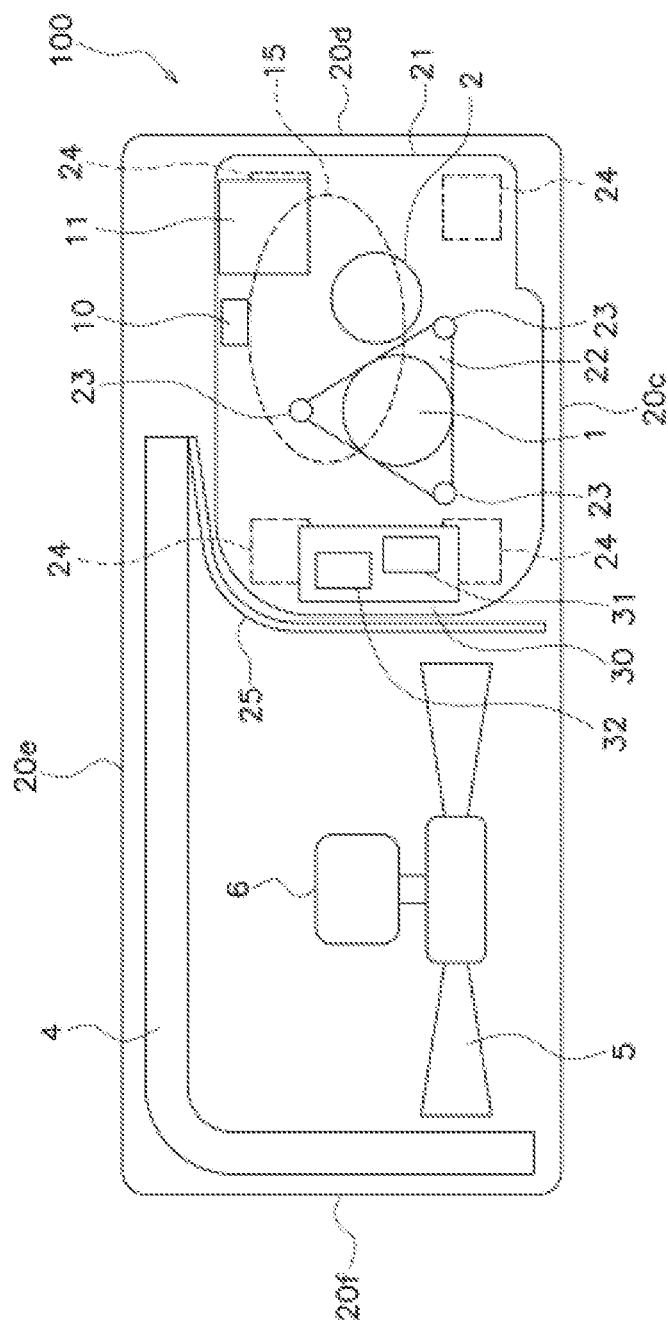
FIG. 4 is a top view of the refrigeration cycle apparatus of the first embodiment.

As illustrated in FIGS. 1, 3, and 4, a housing 20 is constituted by a bottom member 20a, a top member 20b, a front member 20c, a right-side member 20d, a rear member 20e, and a left-side member 20f. The housing 20 covers the outer side of devices constituting the refrigeration cycle.

As illustrated in FIGS. 3 and 4, a space in an inner portion of the housing 20 is divided by a partition plate 25 into, roughly, a heat exchange chamber on the left side in which the air heat exchanger 4 and the fan 5 are disposed and a machine chamber on the right side in which devices, such as the compressor 1, are disposed.

As illustrated in FIG. 3, in the machine chamber, four second elastic members 24 are disposed on the bottom member 20a, and a base 21 is disposed on the second elastic members 24. The second elastic member 24 is disposed at each of the corners of the base 21 in FIG. 4 but may be constituted by one large piece or may be divided into two or more. A material of the second elastic members 24 is rubber or urethane.

The compressor 1 includes an elastic-member mount portion 22. First elastic members 23 are mounted on the elastic-member mount portion 22. The compressor 1 is supported on the base 21 by three first elastic members 23 and bolts (not illustrated). The first elastic members 23 are anti-vibration rubber.

The compressor 1 may be supported on the base 21 by the first elastic members and bolts or may be supported on the base 21 by only the first elastic members.

If being capable of supporting the compressor 1, the first elastic members 23 may be constituted by one piece or may be constituted by a plurality of first elastic members. A material of the first elastic members 23 may be, other than rubber, urethane. The material and the spring constant may be different or the same between the first elastic members 23 and the second elastic members 24.

In other words, the compressor 1 is disposed on a double anti-vibration structure via the first elastic members 23, the base 21, and the second elastic members 24. Consequently, even when the compressor 1 vibrates due to operation of the refrigeration cycle apparatus 100, transmission of the vibration and generation of noise are suppressed by the double anti-vibration structure.

Figure 5:
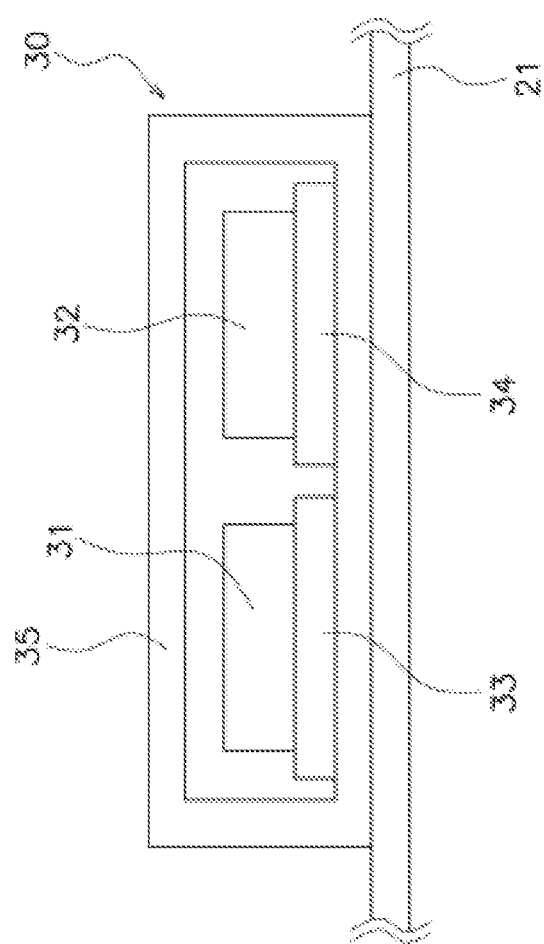
FIG. 5 is a plan of the arrangement of an electric-component unit 30 of the first embodiment.

As illustrated in FIG. 4 and FIG. 5, the electric-component unit 30 includes a first electric component 31, a first substrate 33, a second electric component 32, a second substrate 34, and an electric-component casing 35. The electric-component unit 30 or the electric-component casing 35 is fixed to the base 21. The first electric component 31 is fixed to the electric-component casing 35 via the first substrate 33. The second electric component 32 is fixed to the electric-component casing 35 via the second substrate 34.

The first electric component 31 is a power device that drives a motor for the compressor. The motor for the compressor is a part of the compressor 1. The first electric component 31 may be an intelligent power module (IPM). The first electric component 31 includes a power MOSFET, an insulated-gate bipolar transistor (IGBT), or/and a rectifier transistor. The heat generation amount of the first electric component 31 is large. The heat generation amount of the first electric component 31 is larger than that of the second electric component 32.

The second electric component 32 performs control that differs from control performed by the first electric component 31. The second electric component 32 controls at least the first expansion valve 7. The second electric component 32 also controls the fan motor 6, the second expansion valve 8, and the four-way switching valve 3.

The first electric component 31 and the second electric component 32 may be mounted on the same substrate, as described later in a modification 1A. In the first embodiment, the first electric component 31 and the second electric component 32 are mounted on different substrates. The first electric component 31 and the second electric component 32 are connected to each other by a wire for electric power supply and wires of a control signal line and the like. The compressor 1 and the first electric component 31 are also connected in the same manner.

As illustrated in FIG. 3 and FIG. 4, in addition to the compressor 1 and the electric-component unit 30, the accumulator 2, the economizer heat exchanger 10, the water heat exchanger 11, and other refrigeration-cycle constituent components 15 are also disposed and fixed on the base 21. The frame of the base 21 in FIG. 2 indicates, of components constituting the refrigerant circuit, components disposed on the base 21. The other refrigeration-cycle constituent components 15 include the first expansion valve 7, the second expansion valve 8, the check valve 9, and the four-way switching valve 3. The refrigeration-cycle constituent components 15 are fixed to the base 21 by a pipe and another support member (not illustrated).

(3) Features
(3-1)

In the refrigeration cycle apparatus 100 of the present embodiment, the compressor 1 is disposed on the bottom member 20a via the first elastic members 23, the base 21, and the second elastic members 24. In other words, the double anti-vibration structure is employed to thereby address suppression of transmission of the vibration of the compressor 1 and calmness.

The refrigeration cycle apparatus 100 of the present embodiment includes the first electric component 31 that drives a motor for the compressor 1, and the second electric component 32 that performs different control. The first electric component 31 and the second electric component 32 are connected to each other by wires, such as a signal line, a wire for electric power supply, and the like. The first electric component 31 controls the compressor and thus is reasonably placed close to the compressor. Thus, the first electric component 31 is placed on the intermediate base 21. In contrast, there is no such a necessity for the second electric component 32. In general, the second electric component 32 is fixed, for example, above the compressor 1 to the housing 20. In the present embodiment, however, the second electric component 32 is also placed on the intermediate base 21 in common with the first electric component 31. If the first electric component 31 is fixed to the base 21 with the second electric component 32 fixed to the housing 20, position displacement is generated between the first electric component 31 and the second electric component 32 when the base 21 vibrates. This displacement applies a stress to connection portions where wires are connected to the first electric component 31 and the second electric component 32 and generates a likelihood of occurrence of a connection failure or, in the worst case, disconnection. In contrast, similarly to the present embodiment, if the two components are disposed on the common base 21, displacement between the two components is small, even when the base vibrates, and connection wires are not easily subjected to a stress.

Generally, in the double anti-vibration structure, an anti-vibration effect is increased by increasing the weight of the intermediate base 21. Also in the present embodiment, as a result of not only the first electric component 31 but also the second electric component 32 being placed on the base, vibration suppression and a noise reduction effect are increased.

(3-2)

In the refrigeration cycle apparatus 100 of the present embodiment, the first electric component 31 and the second electric component 32 are housed in and fixed to the same electric-component casing 35. Consequently, a distance between the first electric component 31 and the second electric component 32 is reduced, the wires are shortened, and a failure of connection does not easily occur. Due to both the first electric component 31 and the second electric component 32 being covered by the electric-component casing, it becomes possible to prevent dust, moisture, and the like from adhering to the first electric component and the second electric component.

(4) Modifications
(4-1) Modification 1A

Figure 6:
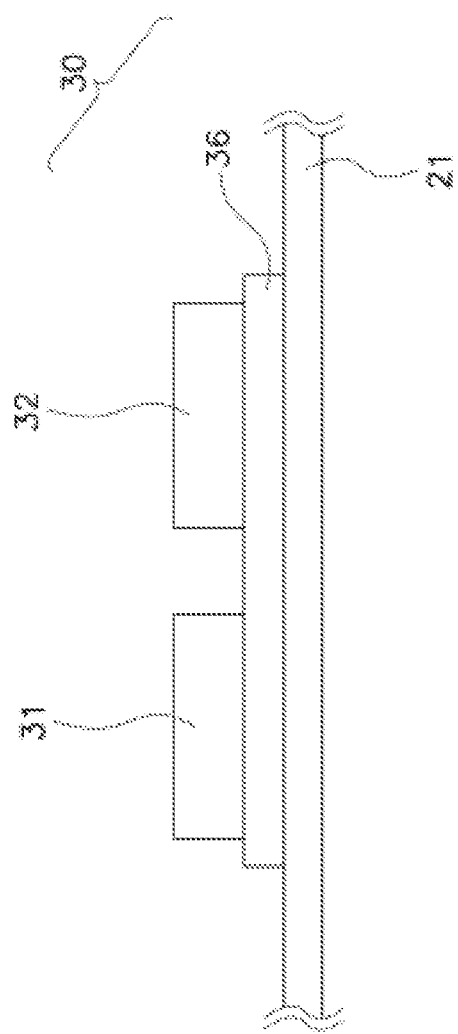
FIG. 6 is a plan of the arrangement of the electric-component unit 30 of a modification 1A.

The modification 1A differs from the first embodiment in terms of the configuration of the electric-component unit 30. The other parts are identical to those in the first embodiment. In the first embodiment, the electric-component unit 30 is in a form, illustrated in FIG. 5, in which the electric-component casing 35 is used. In the modification 1A, as illustrated in FIG. 6, the electric-component unit 30 includes the first electric component 31, the second electric component 32, and a common substrate 36. The first electric component 31 and the second electric component 32 are mounted on the common substrate 36. The common substrate 36 is fixed to the base 21.

Also in the modification 1A, the first electric component 31 and the second electric component 32 are both fixed to the base 21. In the modification 1A, due to the first electric component and the second electric component being mounted on the common substrate 36, it is possible, compared with the first embodiment, to further reduce or eliminate portions connected by wires.

Therefore, even when the base vibrates, electrical connection is not easily subjected to a stress, and a possibility of occurrence of a connection failure and the like is small.

Moreover, as a result of the first electric component 31 and the second electric component 32 being placed on the base 21, a weight on the base 21 is increased, and the vibration suppression and the noise reduction effect are increased.

(4-2) Modification 1B

Figure 7:
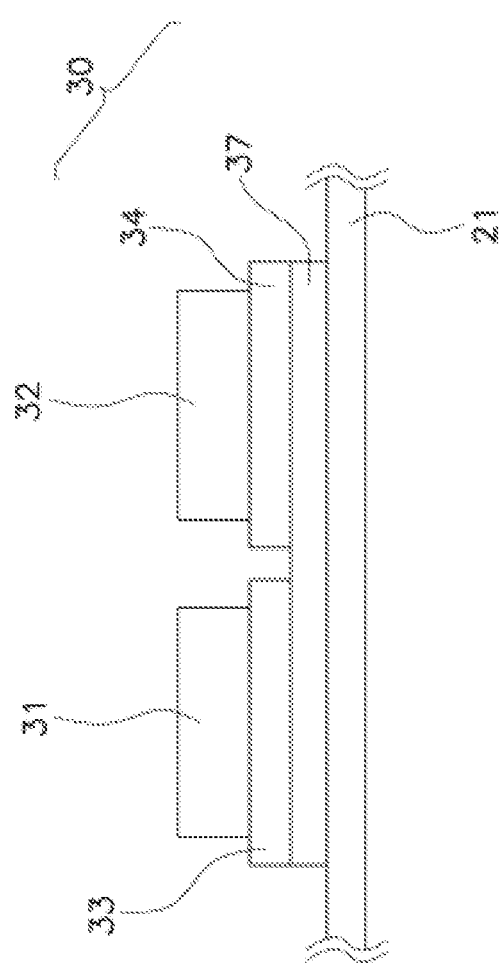
FIG. 7 is a plan of the arrangement of the electric-component unit 30 of a modification 1B.

A modification 1B differs from the first embodiment in terms of the configuration of the electric-component unit 30. The other parts are identical to those in the embodiment 1. In the first embodiment, the electric-component unit 30 is in a form, illustrated in FIG. 5, in which the electric-component casing 35 is used. As illustrated in FIG. 7, in the electric-component unit 30 of the modification 1B, the first electric component 31 and the second electric component 32 are mounted on the first substrate 33 and the second substrate 34, respectively, and the first substrate 33 and the second substrate 34 are fixed to a fixing member 37.

In the modification 1B, as with the first embodiment, the first electric component 31 and the second electric component 32 are fixed to the common base 21, and thus, even when the base vibrates, displacement between the two components is not generated, and connection lines are not easily subjected to a stress. Moreover, as a result of the first electric component 31 and the second electric component 32 being placed on the base 21, a load on the base is increased, and the vibration suppression and the noise reduction effect are increased.

(4-3) Modification 1C

Figure 8:
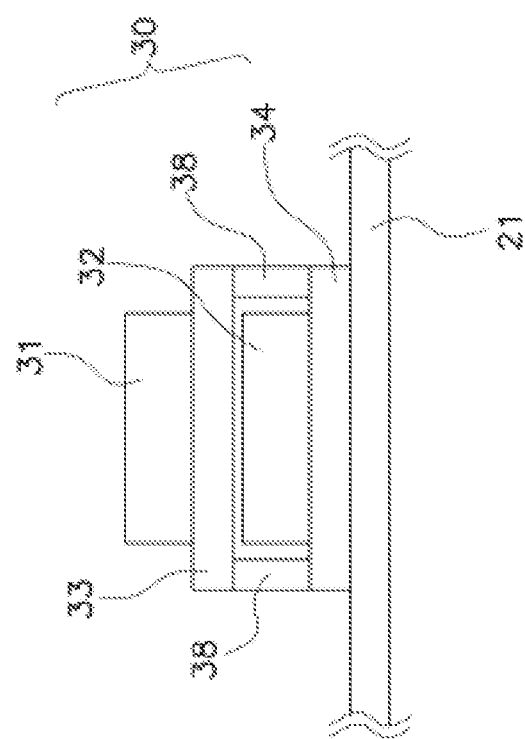
FIG. 8 is a plan of the arrangement of the electric-component unit 30 of a modification

A modification 1C differs from the first embodiment in terms of the configuration of the electric-component unit 30. The other parts are identical to those in the embodiment 1. In the first embodiment, the electric-component unit 30 is in a form, illustrated in FIG. 5, in which the electric-component casing 35 is used. As illustrated in FIG. 8, in the modification 1C, the second electric component 32 is fixed to the base 21 via the second substrate 34. The first electric component 31 is fixed to the first substrate 33, and the first substrate 33 is fixed to the second substrate 34 via a column member 38.

In the modification 1C, as with the first embodiment, the first electric component 31 and the second electric component 32 are fixed to the common base 21, and thus, even when the base vibrates, displacement between the two components is not generated, and connection lines are not easily subjected to a stress. Moreover, as a result of the first electric component 31 and the second electric component 32 being placed on the base 21, a weight on the base 21 is increased, and the vibration suppression and the noise reduction effect are increased.

In the modification 1C, although the first electric component 31 is disposed on the second electric component 32, substantially similar effects can be also expected when the second electric component 32 is disposed on the first electric component 31.

(4-4) Modification 1D

Figure 9:
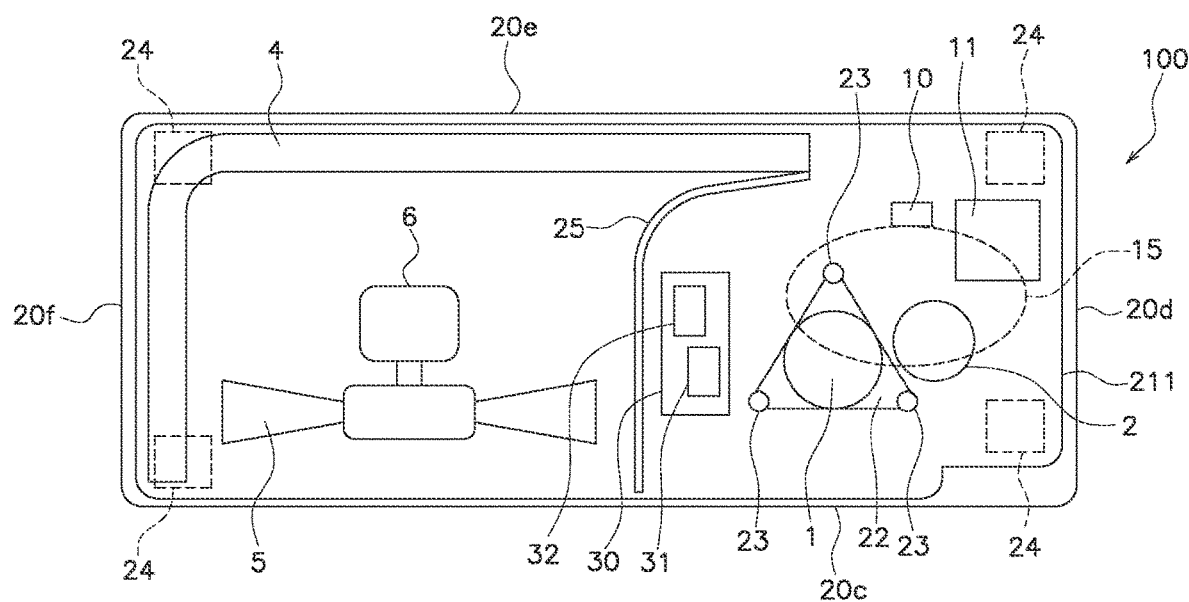
FIG. 9 is a top view of the refrigeration cycle apparatus of the first embodiment with a modification 1D).

The first embodiment is an embodiment in which the devices in the machine chamber on the right side of the partition plate 25 are disposed on the base 21. As illustrated in FIG. 9, a modification 1D is an embodiment in which the heat exchange chamber on the left side of the partition plate 25 is also disposed on the base 211. Operation and the like of each device, and the other features are the same as those in the first embodiment. In this case, the base 211 has a size that is substantially identical to and slightly smaller than the size of a bottom member 20a of housing 20. The fan 5, the fan motor 6, the air heat exchanger 4, and the partition plate 25 are also disposed on and fixed to the base 211.

In the modification 1D, the fan motor 6 is supplied with power and controlled by the second electric component 32.

In the modification 1D, the fan motor 6, the fan 5, and the second electric component 32 are fixed to the same base 211, and thus, even when the base 211 vibrates, a wire that connects the fan motor 6 and the second electric component 32 to each other does not easily receive a stress, and troubles, such as contact failure and disconnection, do not easily occur.

If the fan 5 is fixed to the base 211 with the air heat exchanger 4 fixed to the housing 20, the following problems occur. That is, when the base 211 vibrates, the fan 5 vibrates while the air heat exchanger 4 does not vibrate, and thus, a displacement is generated between the two devices. Then, turbulence of an air flow is generated between the air heat exchanger 4 and an air flow generated by the fan 5, and there is a likelihood of generation of a drift and an eddy.

Consequently, there is a likelihood that an increase of air blowing noise and a decrease of heat exchange efficiency are caused. In contrast, due to the fan 5 and the air heat exchanger 4 being placed on the same base 211, the refrigeration cycle apparatus of the modification 1D is able to suppress such turbulence of the flow of air and, moreover, suppress the increase of the noise and the decrease of the heat exchange efficiency.

In the refrigeration cycle apparatus of the modification 1D, most of circuit components are fixed to the base 211, and thus, there is almost no connection of refrigerant pipes on the base 211 and on the housing 20. When refrigerant circuit components are present on the base 211 and on the housing 20, there is a problem of connection pipes being subjected to a stress. A likelihood of refrigerant leakage and pipe breakage is generated. The refrigeration cycle apparatus of the modification 1D is able to suppress a stress on the pipes caused by the vibration of the base 211.

In a heat exchanger of the modification 1D, as a result of the fan 5, the fan motor 6, the air heat exchanger 4, and the partition plate 25 being disposed on the base 211, a weight that is supported by the base 211 is further increased, and a vibration suppression effect and a noise reduction effect due to the vibration of the compressor are further increased.

(4-5) Modification 1E

In a modification 1E, the refrigeration cycle apparatus further includes a rectifier portion (not illustrated) that rectifies blown air of the fan 5. The rectifier portion is also called bell mouth. Normally, the rectifier portion is fixed to the housing 20, the air heat exchanger 4, and the like. The other features are the same as those in the modification 1D. In the modification 1E, as with the modification 1D, the fan 5, the fan motor 6, the air heat exchanger 4, and the partition plate 25 are also disposed on and fixed to the base 21. The rectifier portion is also fixed to the base 21.

If the fan 5 is fixed to the base 21 with the rectifier portion fixed to the housing 20, the following problems occur. That is, when the base 21 vibrates, the fan 5 vibrates while the rectifier portion does not vibrate, and thus, a displacement is generated between the two devices. Then, turbulence of an air flow is generated by the vibration of the rectifier portion between the air heat exchanger 4 and an air flow generated by the fan 5, and there is a likelihood of generation of a drift and an eddy. Consequently, there is a likelihood that an increase of air blowing noise and a decrease of heat exchange efficiency are caused. In contrast, due to the fan 5 and the rectifier portion being placed on the same base that vibrates, the refrigeration cycle apparatus of the modification 1E is able to suppress such turbulence of the flow of air and, moreover, suppress the increase of the noise and the decrease of the heat exchange efficiency.

In a refrigeration cycle apparatus of the modification 1E, as a result of the fan 5, the fan motor 6, the air heat exchanger 4, the partition plate 25, the rectifier portion, and the like being disposed on the base 21, a weight that is supported by the base 21 is further increased, and the vibration suppression effect and the noise reduction effect due to the vibration of the compressor are further increased.

(4-6) Modification 1F

The refrigeration cycle apparatus 100 of the first embodiment is a water cooling/heating apparatus. In other words, a utilization-side heat exchanger is the water heat exchanger 11.

The refrigeration cycle apparatus of the modification 1F is an air conditioning apparatus. The air conditioning apparatus includes an indoor unit, an outdoor unit, and a refrigerant pipe that connects the two units. The indoor unit uses, as the utilization-side heat exchanger, an indoor heat exchanger. The outdoor unit includes, of the refrigeration cycle apparatus 100 of the first embodiment, almost all of configurations except the water heat exchanger 11. The outdoor unit of the modification 1F also has the double anti-vibration structure similar to those of the refrigeration cycle apparatus 100 of the first embodiment.

As with the refrigeration cycle apparatus 100 of the first embodiment, in the outdoor unit of the refrigeration cycle apparatus of the modification 1F, the first electric component 31 and the second electric component 32 are fixed to the common base 21, and thus, even when the base vibrates, no displacement is generated between the two components, and connection lines are not easily subjected to a stress. Moreover, as a result of the first electric component 31 and the second electric component 32 being placed on the base 21, a weight on the base 21 is increased, and the vibration suppression and the noise reduction effect are increased.

Although embodiments of the present disclosure have been described above, it should be understood that various changes in forms and details are possible without deviating from the gist and the scope of the present disclosure described in the claims.

REFERENCE SIGNS LIST 5 compressor
6 accumulator
7 four-way switching valve
8 air heat exchanger
5 fan
6 fan motor
7 first expansion valve
8 second expansion valve
9 check valve
10 economizer heat exchanger
11 water heat exchanger
20 housing
20a bottom member
21 base
23 first elastic member
24 second elastic member
30 electric-component unit
31 first electric component
32 second electric component
100 refrigeration cycle apparatus

CITATION LIST

Patent Literature

PTL 1: Japanese Unexamined Patent Application Publication No. 2005-241197

The invention claimed is:

1. A refrigeration cycle apparatus comprising:
a housing including a bottom member, and an inner portion forming a heat exchange chamber and a machine chamber;
an air heat exchanger disposed in the heat exchange chamber of the housing;
a second elastic member disposed on the bottom member;
a base disposed on the bottom member via the second elastic member;
a refrigeration-cycle constituent component fixed to the base and the refrigeration-cycle constituent component being one of an accumulator an economizer heat exchanger, a water heat exchanger, a check valve and a four way switching valve or a combination thereof;
a first elastic member disposed on the base;
a compressor disposed in the machine chamber of the housing on the base via the first elastic member and configured to compress a refrigerant;
a first electric component fixed to the base and configured to drive a motor for the compressor; and
a second electric component fixed to the base and configured to perform control that differs from control performed by the first electric component, wherein
the base has an upper surface that contacts the first elastic member and a lower surface that contacts the second elastic member,
the first electric component and the second electric component are fixed to the upper surface directly or indirectly via a substrate and/or an electric-component casing, and
top portions of the first electric component and the second electric component are lower than a top portion of the compressor.

2. The refrigeration cycle apparatus according to claim 1, further comprising:
an expansion valve,
wherein the second electric component is configured to control at least an opening degree of the expansion valve.

3. The refrigeration cycle apparatus according to claim 2, the refrigeration cycle apparatus further comprising:
an electric-component unit including the first electric component and the second electric component, the first component and second component are integral with each other,
wherein the electric-component unit is fixed to the base.

4. The refrigeration cycle apparatus according to claim 2, the refrigeration cycle apparatus further comprising:
a fan fixed to the base and configured to generate a flow of air toward the air heat exchanger; and
a fan motor fixed to the base and configured to drive the fan by being controlled by the second electric component.

5. The refrigeration cycle apparatus according to claim 1, the refrigeration cycle apparatus further comprising:
an electric-component unit including the first electric component and the second electric component, the first component and second component are integral with each other,
wherein the electric-component unit is fixed to the base.

6. The refrigeration cycle apparatus according to claim 5, wherein the electric-component unit further includes the electric-component casing fixed to the base, and
wherein the first electric component and the second electric component are housed in and fixed to the electric-component casing.

7. The refrigeration cycle apparatus according to claim 6, the refrigeration cycle apparatus further comprising:
a fan fixed to the base and configured to generate a flow of air toward the air heat exchanger; and
a fan motor fixed to the base and configured to drive the fan by being controlled by the second electric component.

8. The refrigeration cycle apparatus according to claim 5, the refrigeration cycle apparatus further comprising:
a fan fixed to the base and configured to generate a flow of air toward the air heat exchanger; and a fan motor fixed to the base and configured to drive the fan by being controlled by the second electric component.

9. A refrigeration cycle apparatus comprising:
a housing including a bottom member;
a second elastic member disposed on the bottom member;
a base disposed on the bottom member via the second elastic member;
a first elastic member disposed on the base;
a compressor disposed on the base via the first elastic member and configured to compress a refrigerant;
a first electric component fixed to the base and configured to drive a motor for the compressor;
a second electric component fixed to the base and configured to perform control that differs from control performed by the first electric component;
an air heat exchanger;
a fan fixed to the base and configured to generate a flow of air toward the air heat exchanger; and
a fan motor fixed to the base and configured to drive the fan by being controlled by the second electric component, wherein
the base has an upper surface that contacts the first elastic member and a lower surface that contacts the second elastic member,
the first electric component and the second electric component are fixed to the upper surface directly or indirectly via a substrate and/or an electric-component casing, and
top portions of the first electric component and the second electric component are lower than a top portion of the compressor.

10. The refrigeration cycle apparatus according to claim 9, wherein the air heat exchanger is fixed to the base.

11. A refrigeration cycle apparatus comprising:
a housing including a bottom member;
a second elastic member disposed on the bottom member;
a base disposed on the bottom member via the second elastic member;
a first elastic member disposed on the base;
a compressor disposed on the base via the first elastic member and configured to compress a refrigerant;
a first electric component directly fixed to the base and configured to drive a motor for the compressor; and
a second electric component directly fixed to the base and configured to perform control that differs from control performed by the first electric component, wherein
the base has an upper surface that contacts the first elastic member and a lower surface that contacts the second elastic member,
connection wires, one end of which is electrically connected to the first electric component and the other end of which is electrically connected to the second electric component, and
top portions of the first electric component and the second electric component are lower than a top portion of the compressor.

* * * * *